Sept. 2, 1941.  R. E. BASSETT, JR  2,254,509
SEQUENTIAL CONTROLLER
Filed Nov. 12, 1938  4 Sheets-Sheet 2
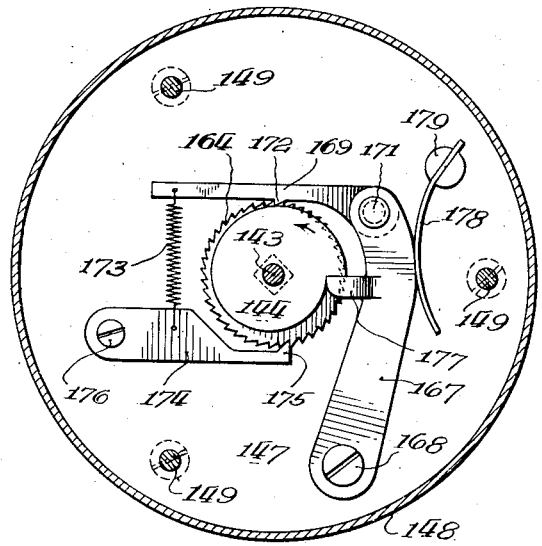
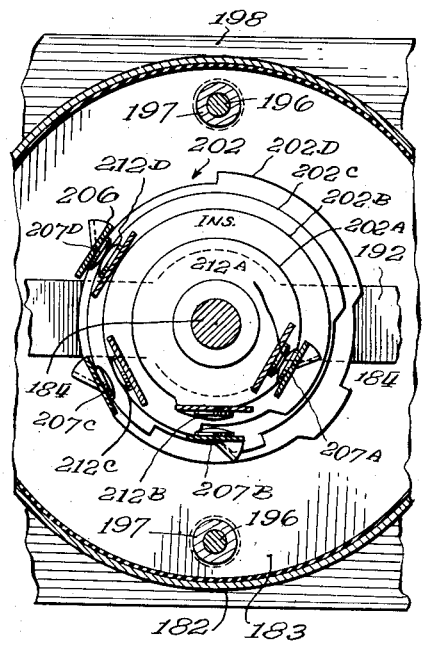
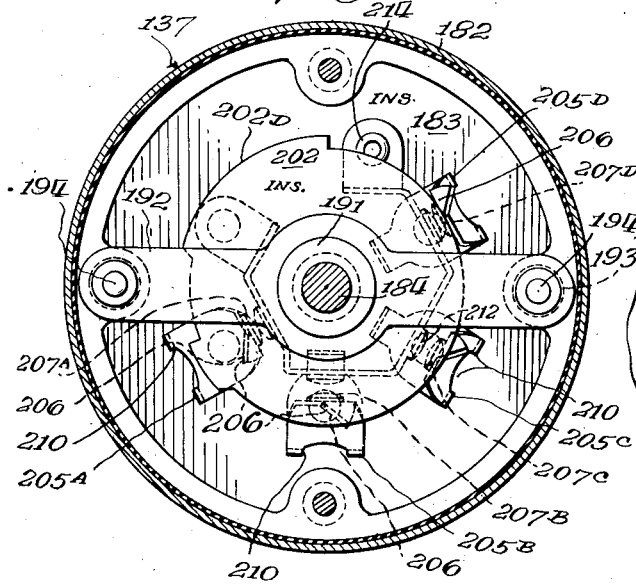
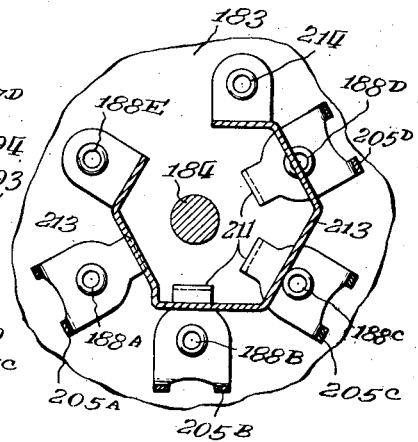
Inventor:
Rex Earl Bassett Jr.
By Williams, Bradbury, McCaleb & Hinkle
Attys.

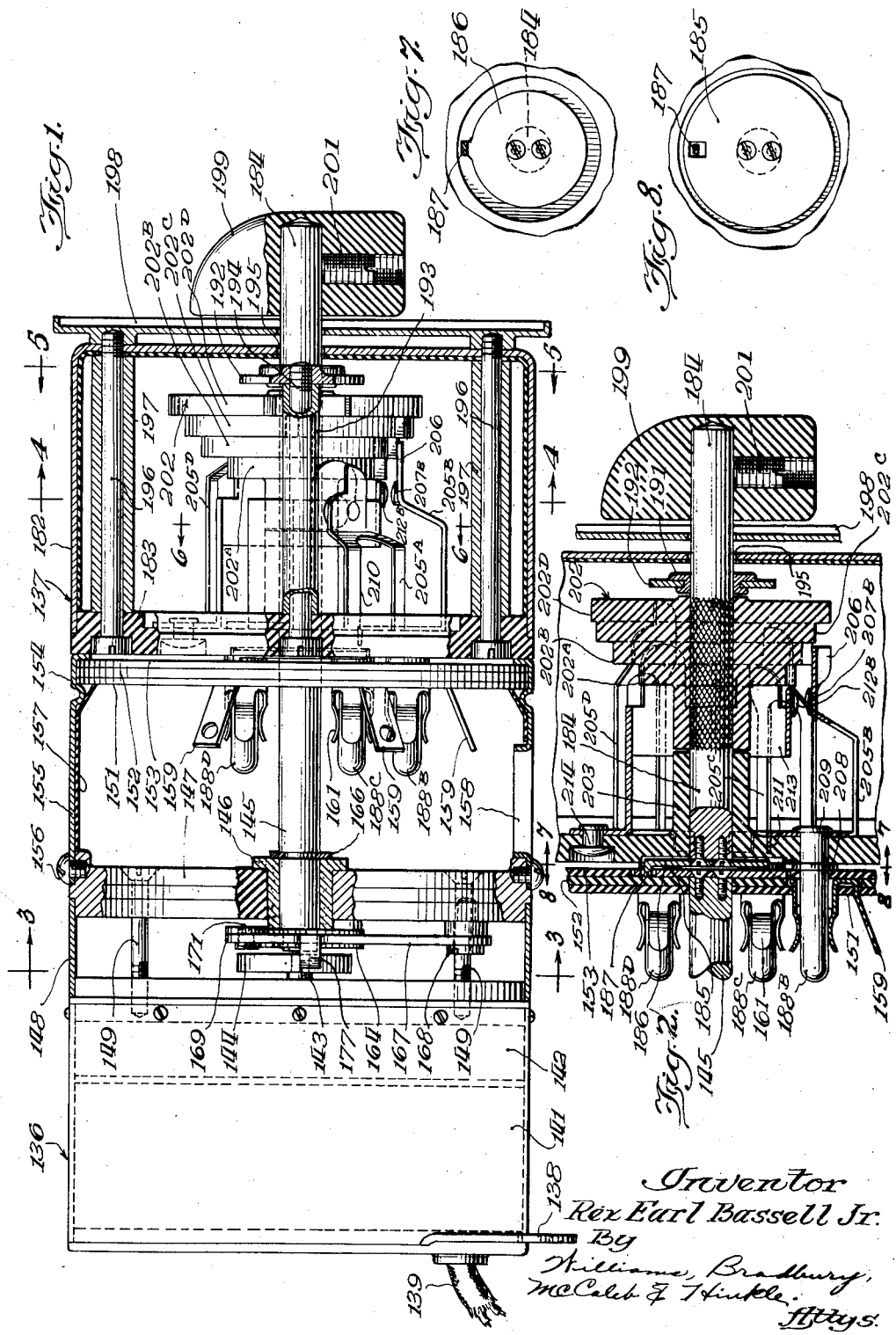

Sept. 2, 1941.   R. E. BASSETT, JR   2,254,509
SEQUENTIAL CONTROLLER
Filed Nov. 12, 1938   4 Sheets-Sheet 3
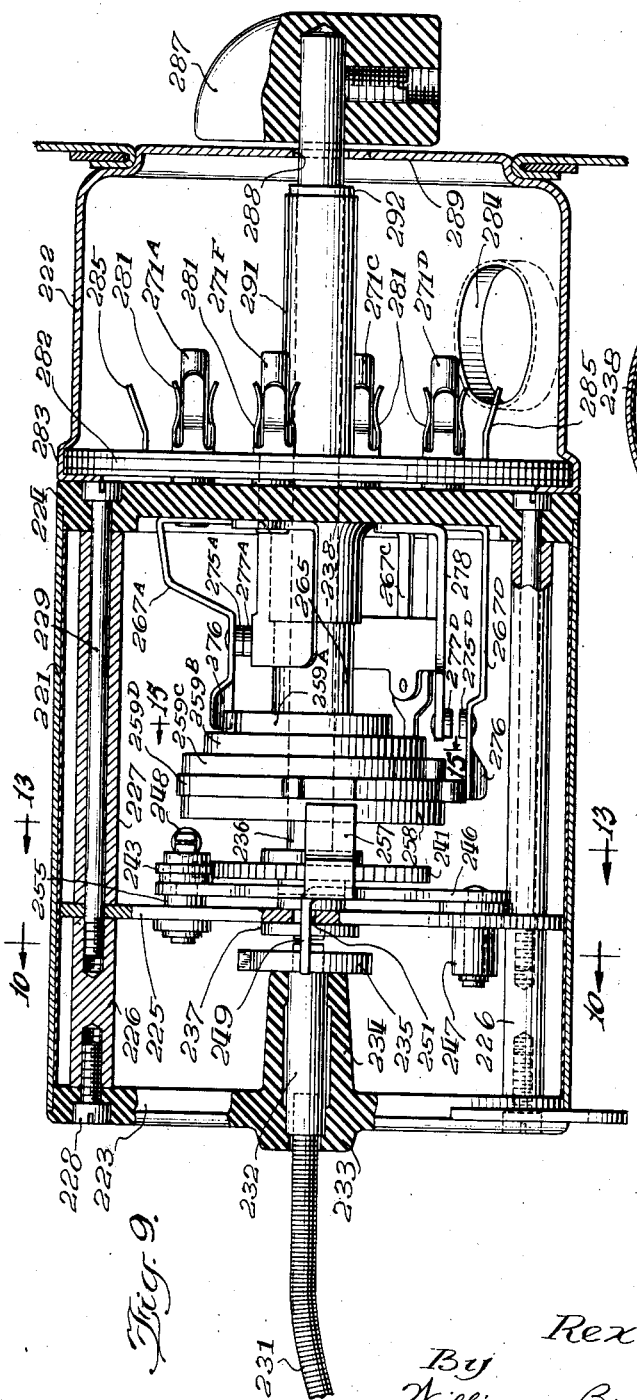
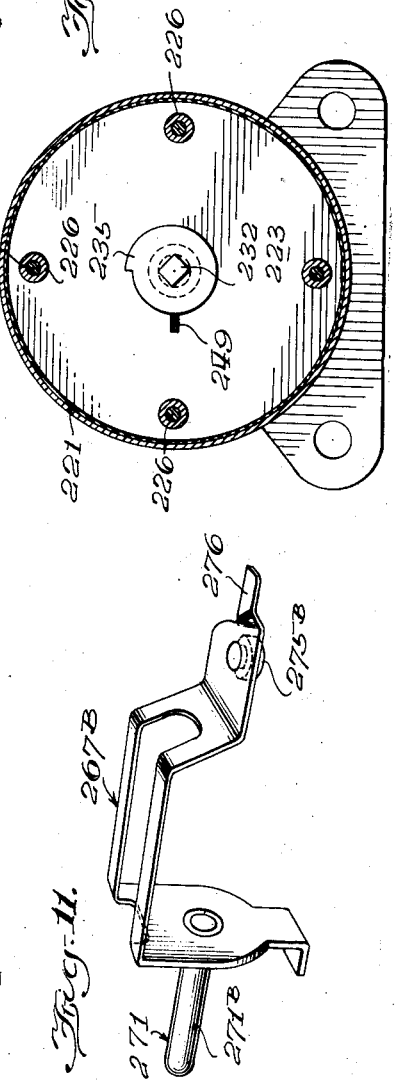
Inventor.
Rex Earl Bassett Jr
By
Williams, Bradbury, McCaleb & Hinkle
Attys.

Sept. 2, 1941. R. E. BASSETT, JR 2,254,509
SEQUENTIAL CONTROLLER
Filed Nov. 12, 1938 4 Sheets-Sheet 4
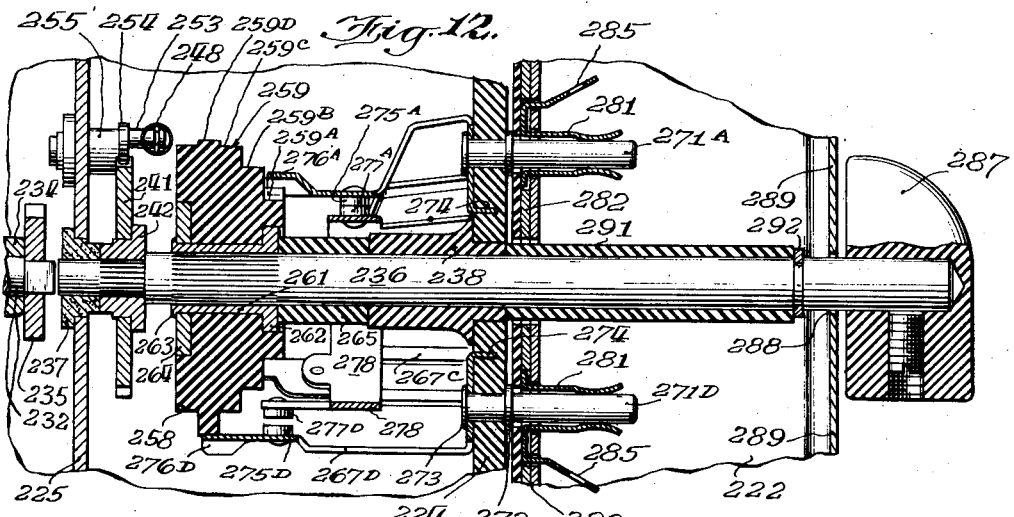
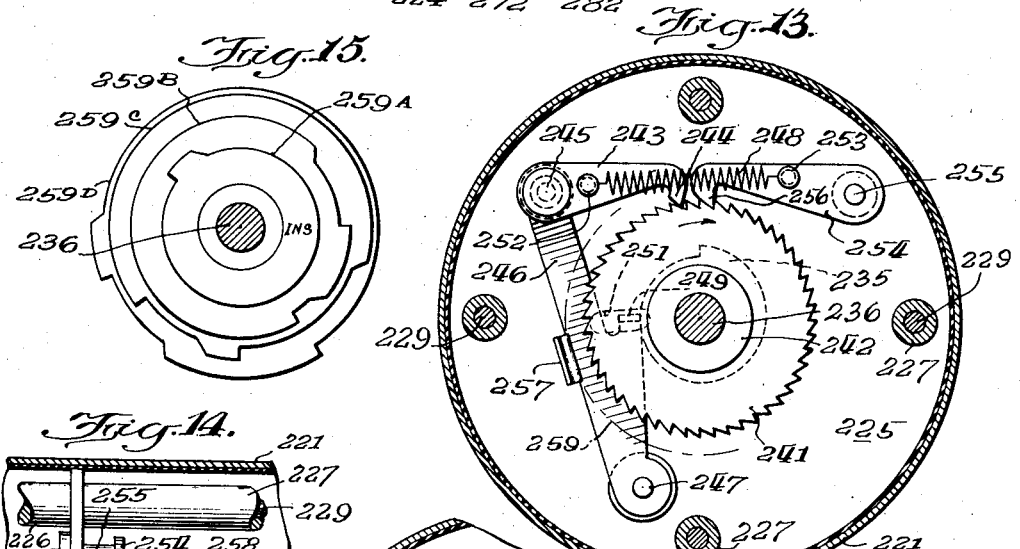
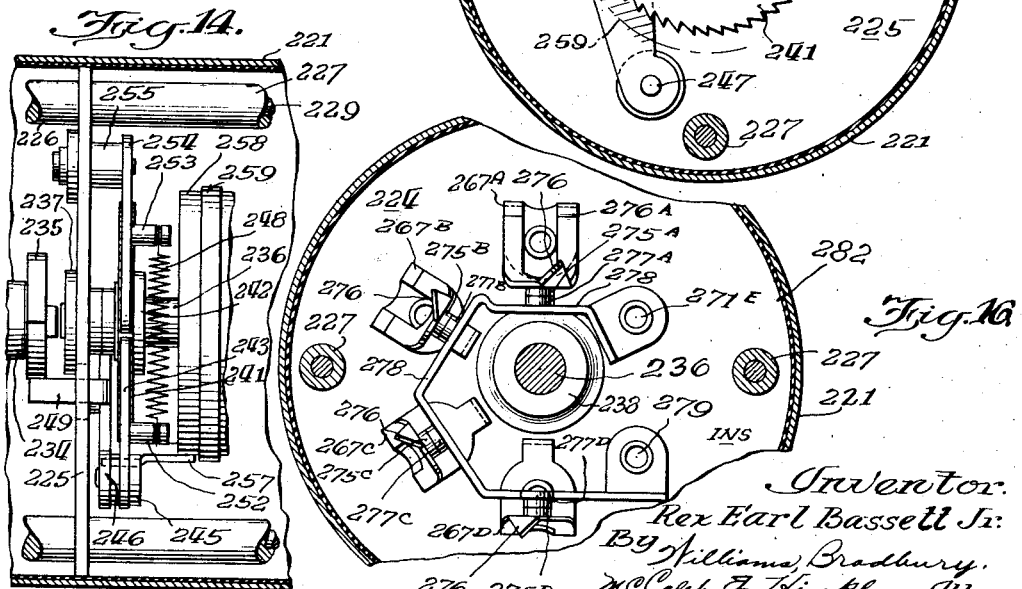
Inventor.
Rex Earl Bassett Jr.
By Williams Bradbury.
McCaleb & Hinkle Attys.

Patented Sept. 2, 1941

2,254,509

UNITED STATES PATENT OFFICE 2,254,509

SEQUENTIAL CONTROLLER

Rex Earl Bassett, Jr., South Bend, Ind., assignor to Bendix Home Appliances, Inc., South Bend, Ind., a corporation of Delaware Application November 12, 1938, Serial No. 240,163

6 Claims. (Cl. 200—33)

This invention relates to sequential controllers and more particularly to electric control means for automatically controlling a machine so as to perform a series of operations in predetermined sequence.

One of the objects of the invention is to provide a sequential controller which is compact, inexpensive to manufacture, and reliable in operation and which may readily be removed from the machine for adjustment or repair.

Another object of the invention is to provide a sequential controller in which the automatic operation may be manually overruled to cut out or vary one or more of the sequences.

Still another object of the invention is to provide a sequential controlling including cam operated switches in which the cam is driven intermittently in steps large enough to insure movement of the switches from one position to another. With this arrangement extreme accuracy in the manufacture of the cam or cams is not necessary.

Other objects, advantages and novel features of the invention will be apparent from the following description of the embodiments shown in the accompanying drawings, in which:

Fig. 1 is a side elevation, partially in section, of a sequential controller embodying the invention;

Fig. 2 is a fragmentary longitudinal section taken through the switch operating cam and switch members of the controller shown in Fig. 1;

Fig. 3 is a transverse vertical section taken along the line 3—3 of Fig. 1 and showing the details of a modified means for imparting intermittent rotary movement to the cam shaft of the controller;

Fig. 4 is a fragmentary transverse vertical section taken along the line 4—4 of Fig. 1;

Fig. 5 is a transverse vertical cross-section taken along the line 5—5 of Fig. 1;

Fig. 6 is a fragmentary transverse vertical section taken along the line 6—6 of Fig. 1;

Fig. 7 is a fragmentary transverse vertical section taken along the line 7—7 of Fig. 2;

Fig. 8 is a fragmentary transverse vertical section taken along the line 8—8 of Fig. 2;

Fig. 9 is a longitudinal vertical section view of another modification of the controller;

Fig. 10 is a transverse vertical section on a reduced scale taken along the line 10—10 of Fig. 9;

Fig. 11 is a perspective view of one of the circuit controlling members shown in Fig. 9;

Fig. 12 is an enlarged fragmentary longitudinal section view through the switch operating cam and switch members of the controller shown in Fig. 9;

Fig. 13 is a transverse vertical section taken along the line 13—13 of Fig. 9, and showing the details of a modified means for imparting intermittent rotary movement to the cam shaft of the controller shown in Fig. 9;

Fig. 14 is a fragmentary top plan view of the details of the intermittent movement imparting means shown in Fig. 13;

Fig. 15 is a fragmentary transverse vertical section taken along the line 15—15 of Fig. 9; and Fig. 16 is a fragmentary transverse vertical section showing the details of the circuit controlling members of Fig. 9.

Referring more particularly to Figures 1 to 8 there is shown a sequential control switch particularly adapted for use with an automatic washing machine. As shown the controller comprises a receptacle 136 adapted to enclose an electric motor or other driving means and a housing 137 for the circuit controlling means.

The receptacle 136 is provided with a pair of ears 138, only one of which is shown, for securing the receptacle to the apparatus to be controlled. It is also provided with an opening on its rear end through which a pair of conductors 139 extend to the motor mounted within portion 141 of the receptacle. The motor is adapted to drive, through suitable gearing in portion 142 of the receptacle, a drive shaft 143 to the end of which is secured a cam 144. The cam imparts intermittent unidirectional motion to a shaft 145 journaled for rotation at its rear end in a bearing 146 mounted in a support 147.

The support 147 is spaced from the gear containing portion 142 of the receptacle by an annular metallic shell 148, and is secured to the portion 142 by a plurality of screw bolts 149. The front end of shaft 145 is journaled for rotation in an annular end portion made of three circular plates 151, 152 and 153 made of suitable insulating material and held in spaced relationship to the support 147 by a bent-over tongue portion 154 formed at the forward end of a metallic cylindrical shell 155 secured to the support 147 by a plurality of peripherally spaced screw bolts 156.

The cylindrical shell 155 is provided with an inner insulating lining 157 and is also provided with a flanged opening 158 through which the various conductors are connected to the terminals 159.

The terminals 159 are formed integrally with sockets 161 which are positioned in openings in the middle disc 152 and are held in place by the inner disc 151 which has a plurality of apertures through which the sockets and terminals project.

A ratchet wheel 164 is fixedly secured to shaft 145 adjacent the cam 144 and from Fig. 1 it may be seen that the shaft 145 is fixed against longitudinal motion by the ratchet wheel and a C-washer 166 on opposite sides of the support 147.

Referring now to Fig. 3, it may be seen that the pawl and ratchet mechanism comprises an arm 167 pivotally mounted upon a stud 168 secured to the support 147. The arm 167 carries at the end opposite the pivot a pawl 169 pivotally mounted upon the arm 167 at 171. The pawl 169 is provided with a toothed portion 172 biased into engagement with the ratchet wheel by a spring 173 connecting the outer end of the pawl to the intermediate portion of a dog 174 provided with a toothed portion 175 engaging the ratchet wheel and pivotally secured to the support 147 by a stud 176. The spring 173 thus maintains the toothed portions of the pawl and dog in engagement with the ratchet wheel and tends to move both the pawl and ratchet into coincidence with a line passing through the pivot points 171 and 176. Rotation is imparted to the ratchet wheel by the cam 144 which is adapted to engage a projection 177 formed intermediate the ends of the arm 167 and by a curved spring 178 which forces the projection 177 to follow the periphery of the cam. The spring 178 is mounted upon a stud 179 secured to the support 147.

The removable portion 137 of the sequential controller comprises a cup shaped metallic housing 182, the rear open end of which is closed by a circular disc 183, also made of suitable insulating material. The disc 183 forms a support for a cam shaft 184 which is driven by shaft 145 through the plug-in driving connection illustrated in Fig. 2. From this figure, and from Figs. 7 and 8, it may be noted that the driving connection comprises a female coupling member, such as the perforated disc 185 secured to the shaft 145 and mounted in a central recess formed in insulating plate 153. The male coupling member is a circular disc 186 simply secured to the adjacent end of shaft 184 and provided with a finger 187 extending into the perforation provided in disc 185.

The support 183 also carries a plurality of prong connectors 188 extending through insulating plates 151, 152 and 153 into the sockets 161 so that the front portion 137 of the receptacle may be removed as a unit from the fixed portion of the controller.

The cam shaft 184 is journaled at its front end in a bearing 191 carried by a transversely extending relatively narrow strip 192 secured to the support 183 by spacing blocks 193 through which extend screw bolts 194.

The housing 182, which is provided at its front end with a centrally located aperture 195 through which the end of shaft 184 extends, is secured to the support 183 independently of the cam shaft by screw bolts 196 extending through spacing blocks 197. The screw bolts 196 are also threaded into a dial plate 198 secured thereby to the front of the cover 182. An indicating knob 199 is secured to the front end of the shaft 184 by suitable means, such as the set screw 201.

The multiple switch operating cam 202 is fixedly secured to shaft 184 between the transverse support 192 and the insulating support 183 and is spaced from the latter by an insulating spacing block 203. From Figs. 1 and 2 it may be seen that the cam comprises four operating portions 202A to 202D, inclusive, each of a different diameter. The diameters of the respective portions increase with the distance of the portion from the support 183. While the cam is shown to be integral in form, it may very well be made up of a plurality of separate sections.

The cam portions have associated therewith a plurality of circumferentially displaced resilient arms 205A to 205D generally parallel to the shaft 184, but provided with fingers 206 adapted to engage the cam surfaces. Secured to the finger portions 206 of the respective arms, are movable contacts 207A to 207D, inclusive. Each of the arms is secured to the support 183 by its associated prong connector 188, which is provided with a shoulder 208 engaging the outside of support 183 and with a portion adapted to be peened over as indicated at 209 (see Fig. 2) to secure the contact carrying arm to the support. In order to add to the strength of the contact carrying arms, the intermediate portions thereof are formed relatively wide and are then cut out, as indicated at 210. Accidental movement of the contact arms is further prevented by providing each with a flange 211 extending into a complementary recess formed in the support 183.

Associated with the movable contacts 207A to 207D, inclusive, are a series of fixed contacts 212A to 212D, inclusive, displaced radially inward from the movable contacts and mounted upon a unitary stamping 213 of relatively heavy and substantially non-resilient material connected to prong connector 188E and secured thereby and by a rivet 214 to the support. From Figs. 5 and 6 it may be seen that the stamping 213 extends substantially all the way around the cam shaft 184, and that the fixed contacts 212 carried thereby are displaced radially inward from their associated movable contacts 207.

In applying the controller to a machine such as an automatic washing machine the terminal 159 adapted for cooperation with the connector 188E is connected to one side of a power line and the other terminals are connected to mechanism to be controlled such as motors, inlet and drain valves, etc. The shaft 184 is normally in the off position in which all of the contacts 207 are disengaged and in order to start the machine the operator turns the shaft through handle 199 to a 'position in which one of the contacts closes. This preferably starts the motor in housing section 141 to drive the cam 144 and may also operate one or more of the mechanisms in the machine.

Rotation of the cam 144 causes the lever 167 to swing about its pivot so that it intermittently turns the ratchet wheel 164 and the shaft 145 which drives the shaft 184. As this latter shaft turns it connects and disconnects the switches in predetermined series in accordance with the cam shapes. It will be apparent that any desired circuit connections may be made to obtain any desired sequence of operations, as for example in the copending application of Rex Earl Bassett, Jr., and John W. Chamberlain, Serial No. 129,429, filed March 6, 1937, which matured into Patent No. 2,165,884 on July 11, 1939.

Since the cams need only move the contacts between fully closed and fully open positions they may be formed of arcuate sections having only two different radii connected by sloping portions. As seen in Figure 5 each cam portion may have two or more radius changes throughout its circumference to open and close its switch two or more times in one revolution. The connecting portions are made of less circumferential length than the distance through which the cam is moved by each intermittent drive operation and are so arranged with respect to the ratchet that the switch will be moved from closed to open position during one driving operation.

If it is desired to omit or shorten any of the operations controlled by the controller, the operator may grasp the handle 199 and turn the shafts 184 and 145 to the desired extent. During such turning the drive ratchet overruns and when the handle is released the intermittent drive through the ratchet will continue.

In the embodiment of the invention illustrated in Figs. 9 to 16 inclusive, the construction is somewhat similar to that described above, with the exceptions that the controller is actuated from a remote source of power, the form of the means for changing a constant rotary motion into an intermittent rotary motion has been modified, and the cam and switch structure has been placed adjacent to the last mentioned means.

Referring particularly to Fig. 9, it may be noted that the controller comprises a fixed rear housing 221 and a movable front housing 222. The former comprises a pair of spaced apart circular end supports 223 and 224 made of insulating material, and an intermediate metallic support 225. The supports are held in spaced apart relationship by a plurality of spacing blocks 226 between supports 223 and 225 and a plurality of longer spacing blocks 227 between supports 224 and 225. Screw bolts 228 secure the rear support 223 to the blocks 227, and screw bolts 229 extending through support 224, spacing blocks 227 and support 225 into threaded engagement with the spacing blocks 226 secure the remaining parts together.

Power is supplied to the controller by means of a flexible shaft 231 adapted to drive a shaft 232 journaled for rotation in a pair of external bosses 233 and 234 formed integrally with the rear support 223. A cam 235 is secured to the front end of shaft 232 for the purpose of imparting intermittent forward motion to a cam shaft 236 through a pawl and ratchet mechanism about to be described.

In the description of the pawl and ratchet mechanism, reference is had particularly to Figs. 9, 12, 13 and 14. From these figures it may be noted that the cam shaft 236 is journaled for rotation in a bearing 237 mounted centrally of the intermediate support 225 and in a combined bearing and spacing block 238 mounted centrally of the front support 224. A ratchet wheel 241 is secured to a hub 242 fixedly mounted to a reduced portion of the cam shaft 236 adjacent the intermediate support 225. The ratchet wheel is actuated by a pawl 243 provided with a toothed portion 244 adapted to engage the ratchet wheel and pivotally mounted at 245 to the free end of a pivotally mounted pawl carrying arm 246.

The arm 246 is pivotally mounted upon a stud 247 carried by the intermediate support 225. Oscillatory movement is imparted to the arm 246 by the cam 235 and a spring 248, the former moving the arm in a counterclockwise direction, as viewed in Fig. 13, by means of a projecting finger 249 formed integrally with the arm 246 and extending into cooperative relationship with cam 235 through an aperture 251 formed in the intermediate support 225. The spring 248 moves the arm 246 in a clockwise direction whenever the projecting finger 249 falls off the high point of the cam.

From Fig. 13 it may be noted that the spring is attached to a stud 252 mounted on pawl 243, and a similar stud 253 mounted upon a dog 254 pivotally mounted upon a stud 255 secured to the support 225 and provided with a toothed portion 256 adapted to engage the ratchet wheel and prevent retrograde movement of the ratchet wheel and cam shaft 236. The pawl and dog have lengths approximately equal to one-half the length of arm 246 and the toothed portions thereof are adjacent one another.

It may be noted from Fig. 13 that the studs 252 and 253 carrying the spring are so arranged with respect to the pawl 243 and dog 254 that they are slightly above a line passing through the centers of the pivot points 245 and 255. Thus, both the pawl and dog are biased into engagement with the ratchet wheel. The spring 244 also serves the additional purpose of maintaining the finger 249 of the arm 246 in engagement with the surface of cam 235.

Referring now particularly to Fig. 14, it may be noted that the spring 248 has a tendency to move the toothed portion of pawl 243 out of engagement with the ratchet wheel, because the spring is placed to one side of the pawl. However, this tendency is eliminated to a certain extent by providing the pawl carrying arm 246 with a second projecting finger 257 adapted to engage the rear portion 258 of the cam 259 mounted on the cam shaft intermediate the supports 224 and 225.

The cam 259 is similar in construction to the cam 202 of the last described modification, except for certain minor details. It is provided with a plurality of cam portions 259A to 259D, inclusive, the diameters of which increase with the distance of the portion from the front support 224. The cam is mounted upon a hub 261 provided with an annular shoulder 262 lying in a recess formed in the front end of the cam and peened over as indicated at 263 to secure in place an annular disc 264 mounted in a recess formed in the rear end of the cam. The cam is spaced from the bearing and spacing block 238 by a central spacing block 265.

The cam portions 259A to 259D, inclusive, have associated therewith a series of circumferentially disposed contact carrying arms 267A to 267D, inclusive, substantially identical in construction with the contact carrying arms 205 of the last described modification. The contact carrying arms lie substantially parallel to the axis of the cam shaft 236 and are secured to the support 224 by the prong contacts 271 provided with shoulders 272 and a peened portion 273 on opposite sides of the support. Movement of the contact carrying arms is further prevented by forming them with fingers 274 adapted to fit into recesses formed in the support 224.

The arms 267 carry contacts 275A to 275D and each has an extending portion 276 adapted to engage corresponding cam portions 259A to 259D, respectively. Each of the movable contacts 275A to 275D has associated therewith a fixed contact 277A to 277D, respectively, carried on a substantially rigid support 278. The support, as may be noted from Fig. 16, substantially surrounds the shaft, so that each fixed contact is directly below its associated movable contact, and the support 278 is secured to the insulating support 224 by a prong contact 271E and a rivet 279.

As stated previously, the arms carrying the movable contacts need not be made of expensive resilient material for the reason that the disengagement of the contacts is not made to depend upon the resiliency, but rather upon the rapidity with which the cam shaft is actuated by the cooperative action of the cam 235 and spring 248 associated with the pawl and ratchet mechanism.

The prong contacts 271 of the fixed receptacle are adapted to enter sockets 281 secured in a manner heretofore described to a three-part support 282 secured to the casing 222 by a bent-over tongue portion 283 formed at the rear end of the latter. The casing 222 is provided with a flanged opening 284 through which the various conductors lead to the terminal portions 285 of the various sockets.

It is not believed necessary to describe the connections of the conductors to the sockets and switch members for the reason that this has been adequately described above. Suffice it to say that the connections are generally the same as those of Figures 1 to 8.

To the front end of the cam shaft 236 is attached the indicating knob 287, the end of the shaft projecting through a central opening 288 formed in the closed front portion 289 of the casing 222. The cam shaft 236 is insulated from the prong contacts and conductors by an insulating sleeve 291 extending substantially the length of the casing 222 and held in place by a collar 292 forced on the cam shaft near the closed portion 289 of the casing 222.

While a number of modified forms of the sequential controller of the present invention have been described above, it should be understood that the present invention is not limited to the specific details thereof nor otherwise than by the terms of the appended claims.

All of the subjecting matter described above is fully disclosed in my application Serial No. 141,078 filed May 6, 1937.

What is claimed is:

1. In a sequential controller mechanism of the type adapted to be plugged into a socket, the combination including supports a sectional shaft journaled for rotation thereon, means including a ratchet wheel on said shaft and pawl mechanism mounted on the first of said supports for driving said shaft with a step-by-step motion in a predetermined direction, a cam mounted on said shaft, said cam comprising a plurality of sections of varying outside diameters arranged so that the cam nearest one of said supports has the smallest diameter, and switch members arranged on said one support circumferentially of said cams and paralleling said shaft and arranged for operation by said cams.

2. A sectional switch unit comprising a receptacle provided wtih electrical terminal sockets and with a prime mover, in combination with a unit including a support, contact prongs adapted to engage said sockets and extending through said support, circuit controlling switch members secured in spaced apart relation on said support by said contact prongs, a shaft journaled in said support and provided with a plug-in drive connection to said prime mover, and a cam secured to said shaft and provided with cam surfaces adapted to engage predetermined ones of said switch members for controlling said circuits.

3. A sequential controller including, in combination, a prime mover comprising a constant speed motor and a cam rotated thereby, a support adjacent to said cam, a second support spaced therefrom, a shaft mounted for rotation on said supports and projecting through said first support, a ratchet wheel mounted on said projecting end, a pawl mechanism pivotally mounted on said first support and actuated by said cam to impart one way step-by-step movement in a predetermined direction to said shaft, said second support being provided with a plurality of sockets connected to electrical circuits and the end of the shaft supported therein being provided with a female driving connection, a cam unit provided with prong connectors and a male driving connection adapted to be plugged into said second support, said cam unit comprising a pair of supports, a shaft journaled for rotation therein and extending through the outermost one of said supports, a multiple surface cam mounted on said shaft, circuit controlling switch members secured by said prong contacts to the support adjacent said second support, and an indicator mounted on the outer end of said second shaft for rotating said shaft, and means associated with said ratchet wheel for preventing rotation of said shafts in a direction opposite to said predetermined direction.

4. In a time controlled circuit controller of the type adapted to be plugged into a socket, the combination including a rotatable shaft, a cam constructed of insulating material and with a plurality of sections having different diameters, a plurality of movable switch members provided with fingers extending into cooperative relation with said cam sections, supporting means for said members including a support constructed of insulating material, and prong connectors extending through said support and adapted to fit into said sockets, said prong connectors being made in the form of rivets for securing said movable switch members to said support.

5. In a time controlled circuit controller of the type adapted to be plugged into a multiple circuit socket, the combination including a rotatable shaft, a cam constructed of insulating material and with a plurality of sections having different diameters, a support of insulating material arranged adjacent said cam and provided with a series of apertures equally spaced from the center thereof, a plurality of prong connectors extending through said support for and adapted to be plugged into said socket, resilient conducting switch arms secured to said support by said prong contacts, said arms extending generally axially of said shaft and having fingers adapted to cooperate with said cam sections, and fixedly mounted switch members displaced radially inward from said resilient arms and engageable thereby.

6. A sequential controller comprising a shaft, a multiple cam mounted on said shaft and having a plurality of cam portions displaced axially along said shaft and which are of progressively increasing size, a support at the end of the shaft beyond the smallest of the cam portions, a plurality of elongated resilient contact members mounted on said support and arranged in annular array around and substantially parallel to said shaft engaging said cam portions respectively whereby the switch members will be moved in predetermined sequence as the cam rotates, and means for rotating said shaft.

REX EARL BASSETT, JR.